United States Patent [19]

Naka

[11] Patent Number: 4,684,963

[45] Date of Patent: Aug. 4, 1987

[54] NOZZLE COVER ASSEMBLY FOR AN INK-ON-DEMAND TYPE INK JET PRINTER

[75] Inventor: Takahiro Naka, Shiojiri, Japan

[73] Assignee: Seiko Epson Kabushiki Kaisha, Japan

[21] Appl. No.: 742,503

[22] Filed: Jun. 7, 1985

[30] Foreign Application Priority Data

Jun. 8, 1984 [JP] Japan ................................ 59-117712
Mar. 15, 1985 [JP] Japan ................................ 60-53054

[51] Int. Cl.[4] ................................ G01D 15/18
[52] U.S. Cl. ................................ 346/140 R
[58] Field of Search ................................ 346/140, 75; 401/243-247

[56] References Cited

U.S. PATENT DOCUMENTS

| | | | |
|---|---|---|---|
| 3,930,260 | 12/1975 | Sicking | 346/140 |
| 4,015,272 | 3/1977 | Yamamori | 346/140 |
| 4,124,853 | 11/1978 | Kattner | 346/140 |
| 4,417,259 | 11/1983 | Maeda | 346/140 |
| 4,533,927 | 8/1985 | Iwagami | 346/140 |

*Primary Examiner*—Joseph W. Hartary
*Attorney, Agent, or Firm*—Blum Kaplan

[57] ABSTRACT

A nozzle cover assembly for an ink-on-demand type ink jet printer is provided. The assembly includes a nozzle cover having a recess on one side in order to form a chamber between the cover and the nozzle. A pressure maintaining device communicates with the recess for maintaining constant pressure in the chamber, thereby preventing ink from being pushed back to an ink supply tank side or from leaking out of the nozzle.

23 Claims, 10 Drawing Figures

FIG. 2
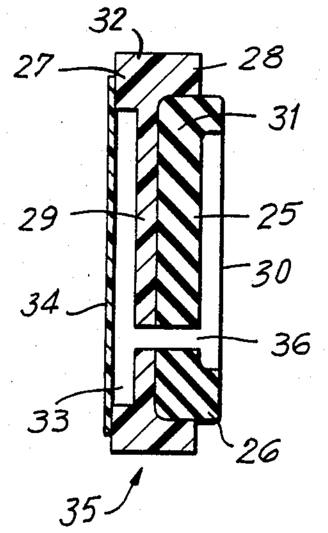
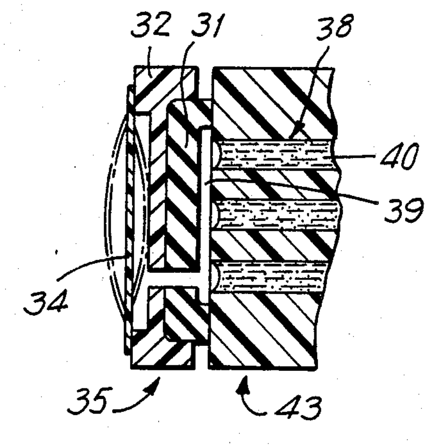
FIG. 3

FIG. 4
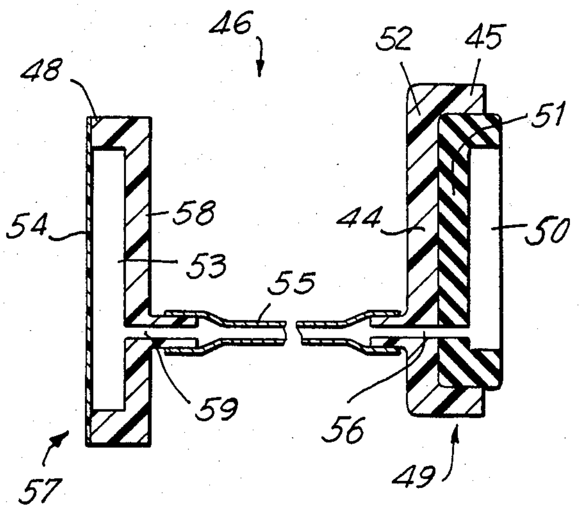
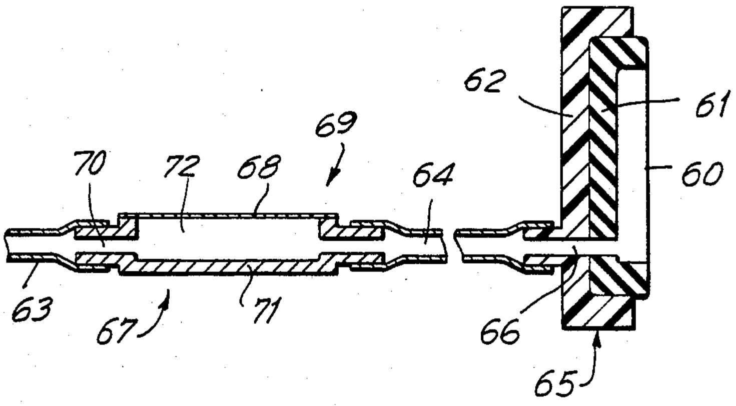
FIG. 5

FIG. 6a
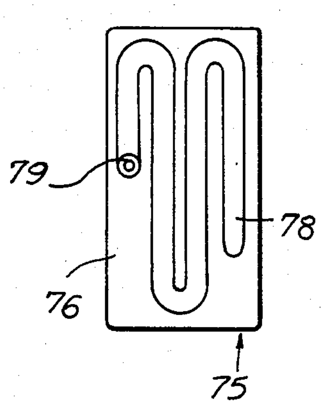
FIG. 6b
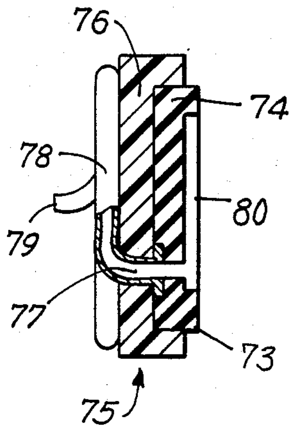
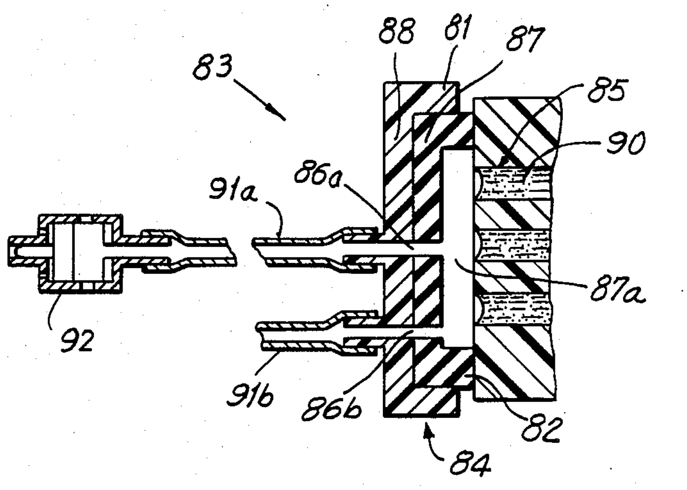
FIG.7

FIG. 8a
PRIOR ART
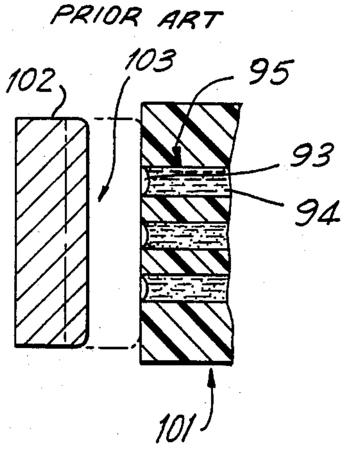
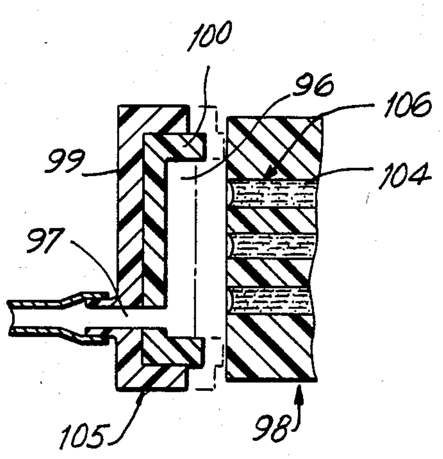
FIG. 8b
PRIOR ART

NOZZLE COVER ASSEMBLY FOR AN INK-ON-DEMAND TYPE INK JET PRINTER

BACKGROUND OF THE INVENTION

This invention relates to an ink-on-demand type ink jet printer and more particularly to a nozzle cover for the printer which reduces ink clogging in the print head.

Conventional ink-on-demand type ink jet printers have a print head and a pressure generating element, such as a piezo-electric or a heating element attached thereto. The head includes a nozzle for ejecting ink, an ink supply tank and a capillary tube for connecting the nozzle to the ink supply tank. In operation, ink is ejected onto a piece of paper by activating the pressure generating element by a print signal.

The print head of a conventional printer is not fully satisfactory as the air in the tip of the nozzle in the print head expands or contracts. This causes ink in the tip of the nozzle to be pushed back inward or leak from the nozzle.

Accordingly, it is desirable to provide an improved ink jet printer which has reduced clogging in the print head with limited movement of ink in the nozzle away from the tip due to an increase in air pressure.

SUMMARY OF THE INVENTION

Generally speaking, in accordance with the invention, an improved ink-on-demand type ink jet printer is provided. The printer includes a print head having at least one nozzle and a cover for selectively covering the nozzle. The cover has a recess on one side in order to form a chamber between the cover and the nozzle when the cover covers the nozzle. A pressure maintaining device communicates with the chamber for maintaining constant pressure in the chamber. The nozzle cover includes a body formed with a recess for receiving a cup-shaped gasket which abuts the nozzle and forms the chamber described.

Accordingly, it is an object of the invention to provide an improved ink-on-demand type ink jet printer.

Another object of the invention is provide an improved ink jet printer which prevents evaporation of ink in the nozzle.

A further object of the invention is to provide an improved ink jet printer which inhibits ink flow away from the nozzle tip during non-ejection.

Yet another object of the invention is to provide a nozzle cover for ink jet printer for preventing clogging of the nozzle and preventing ink from flowing away from the nozzle tip.

Still other objects and advantages of the invention will, in part, be obvious and will, in part, be apparent from the specification.

The invention accordingly comprises the features, construction, combination of elements, and arrangement of parts which will be exemplified in the construction herein set forth and the scope of the invention will be indicated in the claims.

BRIEF DESCRIPTION OF THE DRAWINGS

For a fuller understanding of the invention, reference is had to the following description taken in connection with the accompanying drawings in which:

FIG. 2 is a sectional view of a nozzle cover in accordance with the invention;

FIG. 3 is a sectional view of the nozzle cover of a printer shown in FIG. 1 shown covering a printer nozzle;

FIG. 4 is a sectional view of a nozzle cover in accordance with another embodiment the invention;

FIG. 5 is a sectional view of a nozzle cover in accordance with a further embodiment of the invention;

FIG. 6*a* is a plan view of a nozzle cover in accordance with another embodiment of the invention;

FIG. 6*b* is a sectional view of the nozzle cover shown in FIG. 6*a;*

FIG. 7 is a sectional view of a nozzle cover in accordance with another embodiment of the invention;

FIG. 8*a* is a sectional view of a nozzle cover in accordance with the prior art; and FIG. 8*b* is a sectional view of another nozzle cover in accordance with the prior art.

DESCRIPTION OF THE PREFERRED EMBODIMENTS

Figure 1:
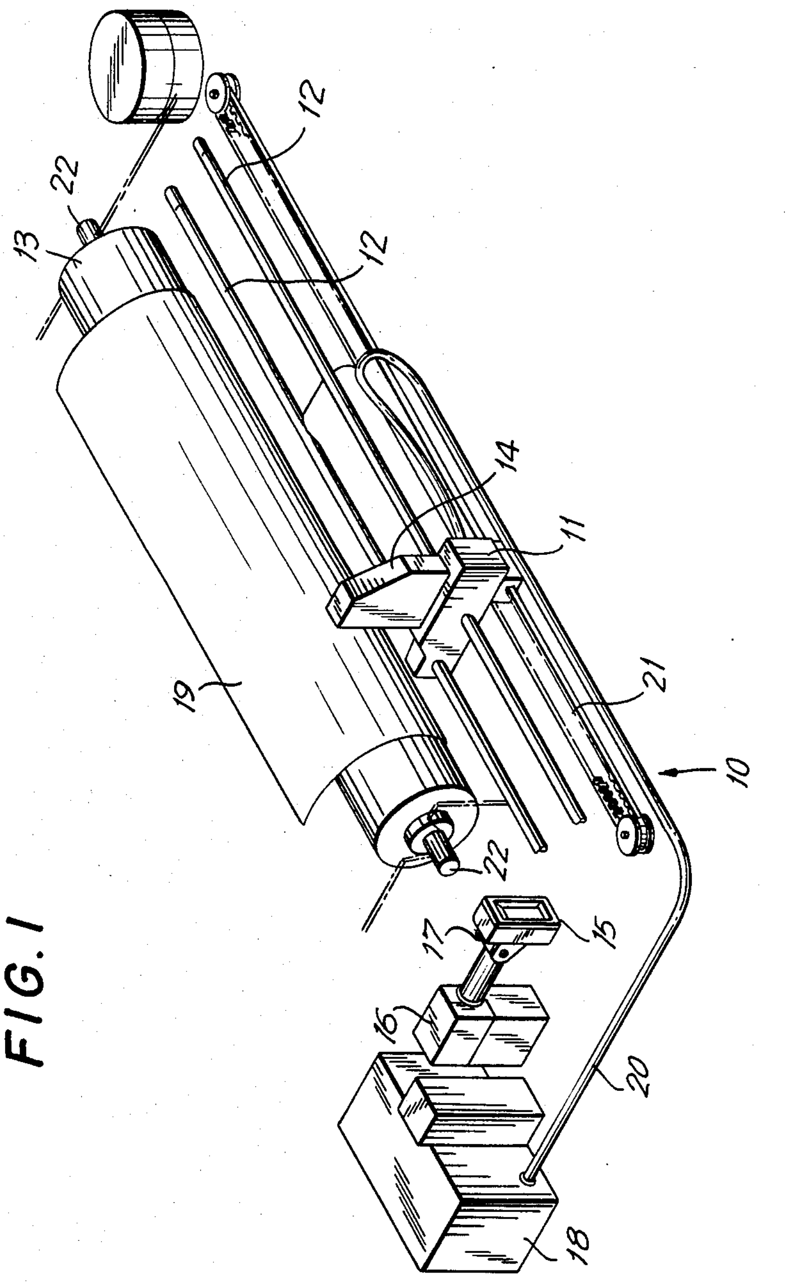
FIG. 1 is a perspective view of an ink-on-demand type ink jet printer including a nozzle cover in accordance with the invention.

Reference is made first to FIG. 8*a* which illustrates a print head 101 and a nozzle cover 102 of a printer in accordance with the prior art. Nozzle cover 102 is a plate member having a substantially planar front surface 103 formed of an elastic material. The plate member abuts a nozzle 95 when the printer is not operational. Accordingly, ink evaporation does not occur.

Print head 101 is not fully satisfactory since ink 94 in nozzle 95 flows inward during non-injection due to surface tension. As a result, a small amount of air 93 remains at the tip of nozzle 95. If air pressure increases, the pressure of air 93 pushes ink 94 further inward and away from the tip of nozzle 95. If the printer is then activated, ink will not properly eject.

In order to overcome this problem, cap member 105, as shown in FIG. 8*b,* may be used. Cap member 105 is formed with a cup-shapd base 99 with a recess on one surface for receiving a gasket 100. Gasket 100 is also cup-shaped and defines a chamber 96 when cap member 105 abuts a nozzle 106. A passage 97 is formed through gasket 100 and base 99 to communicate with a negative pressure generating device. If the negative pressure device is activated prior to the start of printing, ink 104 is forced outward toward the tip of nozzle 106 which causes excess ink to be ejected from nozzle 106. However, this type of cap member is also not fully satisfactory. When cap member 105 abuts nozzle 106 of the print head, while the print head is not operational air pressure in chamber 96 will increase if the temperature rises. As before, ink 104 at the tip of nozzle 106 is pushed further inward away from the nozzle opening in nozzle 106.

Reference is now made to FIG. 1 which illustrates an ink-on-demand type ink-jet-printer 10 in accordance with the invention. Printer 10 includes a print head 14 mounted on top of a carriage 11 and an ink supply tank 18. Carriage 11 moves slidably along a pair of guide members 12 in response to operation of a pulley 21. Print head 14 is formed with at least one nozzle for ejecting ink. Ink is stored in supply tank 18 and is supplied to print head 14 by an ink supply tube 20 as print head 14 moves transversely across a print paper 19 when pulley 21 is operational so that ink may be ejected at various positions along paper 19. Paper 19 is disposed about a platen 13 which rotates about a shaft 22 in response to a rotational force applied thereto.

A nozzle cover 15 is pivotably attached to a rotary shaft 17 fitted to an actuator 16. When ink is not being ejected from the nozzle and print head 14 is in the home position, nozzle cover 15 is activated and abuts print head 14.

FIG. 2 illustrates the preferred embodiment of a nozzle cover 35 constructed in accordance with the invention. A nozzle cover 35 includes a body 32 formed with a base 29 and a side wall 28 defining a recess for receiving a gasket 31. Body 32 includes a second side wall 27 on the opposite surface which defines an expansion chamber 33. Body 32 is made of a substantially rigid material, such as synthetic resin.

Gasket 31 is formed with a base 25 and a side wall 26 defining a gasket recess 30. Expansion chamber 33 communicates with gasket recess 30 through a passage 36 formed in gasket 31 and body 32. A diaphragm 34 is mounted to second side wall 27 over expansion chamber 33 and is preferably made of nylon or a fluorine resin impermeable to gas.

Turning to FIG. 3, nozzle cover 35 is shown in operation abuting print head 43 and gakset 31 tightly covers nozzle 38 after printing is completed in response to a position sensor signal. As a result, a chamber 39 is formed between gasket 31 and print head 43. Vapor pressure in chamber 39 quickly reaches saturation so that ink 40 in nozzle 38 does not dry out and nozzle 38 does not clog. If air temperature increases, gas in chamber 39 expands. In response, diaphragm 34 swells outwardly away from body 32 and pressure in chamber 39 remains constant. Therefore, ink 40 is not pushed back to the tank side. If air in chamber 39 contracts due to a temperature drop, diaphragm 37 swells inwardly towards body 32 and pressure in chamber 39 remains constant. Hence, ink does not leak from nozzle 38.

Reference is now made to FIG. 4 which illustrates a second embodiment of a nozzle cover assembly 46 constructed in accordance with the invention. Nozzle cover assembly 46 includes a nozzle cover 49 and an expansion chamber 57 communicating therewith. Nozzle cover 49 includes a body 52 formed with a base 44 and a side wall 45 defining a recess for receiving a gasket 51. Gasket 51 is formed with a base and a side wall as previously described in connection with the embodiment of FIG. 2 for defining a recess 50. A passage 56 is formed through gasket 51 and body 52.

Expansion chamber 57 includes a cup-shaped base 58 formed with a rim 48 for defining a recess 53 with a diaphragm 54 mounted thereon. Base 58 is formed with a passage 59 for communicating with gasket recess 50 by a tube 55. This construction is advantageous since nozzle cover 49 may be increased or decreased in size depending on the head size. Additionally, the size of expansion chamber 57 may be varied as needed.

FIG. 5 illustrates a third embodiment of a nozzle cover assembly 69 constructed in accordance with the invention. Nozzle cover assembly 69 includes a nozzle cover 65 and an expansion chamber 67. Nozzle cover 65 includes a body 62, a gasket 61 defining a gasket recess 60 and a passage 66 as previously described in connection with the embodiment of FIG. 4.

Expansion chamber 67 is formed with a base 71 defining a recess 72 with a diaphragm 68 disposed over recess 72. Expansion chamber 67 communicates with gakset recess 60 by a tube 64. Diaphragm 68 flexes to allow air within recess 72 to expand or contract in order to equalize pressure within recess 60. Base 71 is formed with an exit opening 70 which is connected to a suction device by a pipe 63.

In the embodiment of FIG. 5, if gas expands in recess 60 after nozzle cover 65 is disposed on a nozzle, diaphragm 68 swells outwardly from base 71 so that air pressure in recess 60 does not increase. If the suction device is activated, ink is forcedly sucked out. This eliminates clogging in a print head which has not been used for a very long time.

Reference is now made to FIGS. 6*a* and 6*b* which illustrate a fourth embodiment of a nozzle cover assembly 75 in accordance with the invention. Nozzle cover assembly 75 includes a body 76 formed with a recess on one surface for receiving a gasket 74. Gasket 74 includes a side wall 73 defining a gasket recess 80. A passage 77 as previously described in the earlier embodiments is formed through gasket 74 and body 76. A length of tubing 78 is mounted onto the opposed surface of body portion 76 and is coupled to recess 80 at passage 77. Tubing 78 leads to opening 79 which empties into the air. Tubing 78 is arranged in a zig-zag pattern to allow increased length over a small surface. Tubing 78 is all or partially formed of a capillary tube.

In operation, gas in gasket recess 80 which has expanded due to a temperature increase is discharged through tubing 78. Ink on the tip of a nozzle covered by nozzle cover assembly 75 will not dry and clog the nozzle since tubing 78 is long and capillary enough so that the ink solvent vapor makes almost no movement.

Reference is made to FIG. 7 which illustrates a fifth embodiment of a nozzle cover assembly 83 constructed in accordance with the invention. Nozzle cover assembly 83 includes a nozzle cover 84 having a body 88 formed with a base and side wall 81 for defining a recess for receiving a gasket 87 therein. Gasket 87 is formed with a base and a side wall 82 for defining a gasket chamber 87*a*. Two passages 86*a* and 86*b* are formed through gasket 87 and body 88. Nozzle cover 84 is shown covering a nozzle 85 housing ink 90 as described in connection with FIG. 3.

A check valve 92 communicates with chamber 87*a* by a tube 91*a* and a suction device is coupled to chamber 87*a* by a tube 91*b*. When check valve 92 is opened, air pressure in chamber 87*a* is regulated by the atmosphere and the suction device. When check valve 92 is closed, the air pressure is regulated by the suction device.

A nozzle cover assembly in accordance with the invention reduces ink evaporation in a print head and thereby prevents nozzle clogging. Furthermore, air pressure in the chamber formed between the nozzle cover assembly and the nozzle is maintained at a substantially constant value so that ink remains in the nozzle tip for later ejection.

During prolonged non-use of the printer, if useable ink may not remain in the nozzle tip despite the nozzle cover assembly of the invention covering the nozzle, ink may be forcedly drawn to the tip of the nozzle by the use of a suction device connected to the nozzle cover assembly.

It will thus be seen that the objects set forth above, among those made apparent in the preceding description are efficiently attained and, since certain changes may be made in the above construction without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An ink-on-demand type ink jet printer comprising:

a print head formed with at least one nozzle for ejecting ink;

a nozzle cover for selectively covering said at least one nozzle, said cover formed with a recess on one side in order to form a nozzle chamber between said cover and said at least one nozzle of said print head when said nozzle cover covers said at least one nozzle; and a pressure maintaining means communicating with the nozzle chamber for maintaining substantially constant pressure in the chamber and defining a closed volume with the nozzle chamber when the nozzle cover covers the at least one nozzle, said pressure maintaining means maintaining substantially constant pressure in the chamber by varying the size of the closed volume.

2. The ink jet printer of claim 1, wherein said cover includes a body having a first surface and a second surface, said body formed with a body recess on said first surface for receiving a gasket therein, said gasket formed with a base and a side wall to define said recess of said nozzle cover.

3. The ink jet printer of claim 2, wherein said pressure maintaining means is an expansion chamber.

4. The ink jet printer of claim 3, wherein said expansion chamber includes a base and a rim for defining said expansion chamber, and a diaphragm mounted to said rim and over said chamber.

5. The ink jet printer of claim 2, wherein said pressure maintaining means is a check valve, said valve having a first position opened to the air and a second position closed to the air.

6. The ink jet printer of claim 5, wherein said check valve is connected to the chamber by a tube.

7. The ink jet printer of claim 1, wherein the pressure maintaining means is an expansion chamber.

8. An ink-on-demand type ink jet printer comprising:

a print head formed with at least one nozzle for ejecting ink;

a nozzle cover for selectively covering said at least one nozzle, said cover formed with a recess on one side in order to form a nozzle chamber between said cover and said at least one nozzle of said print head when said nozzle cover covers said at least one nozzle; and a pressure maintaining means communicating with the nozzle chamber for maintaining substantially constant pressure in the chamber, wherein said cover includes a body having a first surface and a second surface, said body formed with a body recess on said first surface for receiving a gasket therein, said gasket formed with a base and a side wall to define said recess of said nozzle cover, said pressure maintaining means being an expansion chamber including a base and a rim for defining said expansion chamber, and a diaphragm mounted to said rim and over said chamber, wherein said expansion chamber communicates with the nozzle chamber by means of a cover passageway disposed in said body and said gasket.

9. The ink jet printer of claim 8, wherein said expansion chamber is formed with a passageway in said expansion chamber base, said expansion chamber passageway connected to said cover passageway.

10. An ink-on-demand type ink jet printer comprising:

a print head formed with at least one nozzle for ejecting ink;

a nozzle cover for selectively covering said at least one nozzle, said cover formed with a recess on one side in order to form a nozzle chamber between said cover and said at least one nozzle of said print head when said nozzle cover covers said at least one nozzle; and a pressure maintaining means communicating with the nozzle chamber for maintaining substantially constant pressure in the chamber, wherein said cover includes a body having a first surface and a second surface, said body formed with a body recess on said first surface for receiving a gasket therein, said gasket formed with a base and a side wall to define said recess of said nozzle cover, said pressure maintaining means being an expansion chamber including a base and a rim for defining said expansion chamber, and a diaphragm mounted to said rim and over said chamber, wherein said expansion chamber and recess are unitarily formed in the body with the expansion chamber disposed on said second surface of said body.

11. The ink jet printer of claim 9, wherein said expansion chamber passageway is connected to said cover passageway by means of a tube.

12. The ink jet printer of claim 11, wherein said expansion chamber further includes a second passageway disposed in said base of said expansion chamber, said second passageway connects said expansion chamber to a suction means.

13. An ink-on-demand type ink jet printer comprising:

a print head formed with at least one nozzle for ejecting ink;

a nozzle cover for selectively covering said at least one nozzle, said cover formed with a recess on one side in order to form a nozzle chamber between said cover and said at least one nozzle of said print head when said nozzle cover covers said at least one nozzle; and a pressure maintaining means communicating with the nozzle chamber for maintaining substantially constant pressure in the chamber, wherein said cover includes a body having a first surface and a second surface, said body formed with a body recess on said first surface for receiving a gasket therein, said gasket formed with a base in the side wall to define said recess of said nozzle cover, wherein said pressure maintaining means is a capillary tubing, said tubing having a first end communicating with the nozzle chamber and a second end opening into the air which causes the nozzle to be surrounded by ink solvent vapor.

14. An ink-on-demand type ink jet printer comprising:

a print head formed with at least one nozzle for ejecting ink;

a nozzle cover for selectively covering said at least one nozzle, said cover formed with a recess on one side in order to form a nozzle chamber between said cover and said at least one nozzle of said print head when said nozzle cover covers said at least one nozzle; and a pressure maintaining means communicating with the nozzle chamber for maintaining substantially constant pressure in the chamber, wherein said cover includes a body having a surface and second surface, said body formed with a body recess on said first surface for receiving a gasket therein, said gasket formed with a base and a side wall to define said recess of said nozzle cover, wherein said pressure maintaining means is a check valve, said valve having a first position open to the air and a second position closed to the air and said chamber also communicates with a suction means.

15. The ink jet printer of claim 14, wherein said suction means communicates with said chamber by means of a second passageway disposed in said body and said gasket.

16. A nozzle cover assembly for selectively covering the nozzles of a print head on an ink-on-demand type ink jet printer, comprising:

a nozzle cover having a recess on one side in order to form a nozzle chamber between said cover and said at least one nozzle of said print head when said nozzle cover covers said nozzle; and a pressure maintaining means communicating with the nozzle chamber for maintaining substantially constant pressure in the chamber and defining a closed volume with the nozzle chamber when the nozzle cover covers the at least one nozzle, said pressure maintaining means maintaining substantially constant pressure in the chamber by varying the size of the closed volume.

17. The nozzle cover assembly of claim 16, wherein said cover includes a body having a first surface and a second surface, said body formed with a body recess on said first surface for receiving a gasket therein, said gasket formed with a base and a side wall to define said recess of said nozzle cover.

18. The nozzle cover assembly of claim 17, wherein said pressure maintaining means is an expansion chamber.

19. The nozzle cover assembly of claim 18, wherein said expansion chamber includes a base and a rim for defining said expansion chamber, and a diaphragm mounted to said rim and over said chamber.

20. The nozzle cover assembly of claim 19, wherein said expansion chamber and recess are unitarily formed in the body with the expansion chamber disposed on said second surface of said body.

21. The nozzle cover assembly of claim 17, wherein said pressure maintaining means is a check valve, said valve having a first position opened to the air and a second position closed to the air.

22. The nozzle cover assembly of claim 16, wherein said pressure maintaining means is an expansion chamber.

23. A nozzle cover assembly for selectively covering the nozzles of a print head on an ink-on-demand type ink jet printer, comprising:

a nozzle cover having a recess on one side in order to form a nozzle chamber between said cover and said at least one nozzle of said print head when said nozzle cover covers said nozzle; and a pressure maintaining means communicating with the nozzle chamber for maintaining substantially constant pressure in the chamber, wherein said cover includes a body having a first surface and a second surface, said body formed with a body recess on said first surface for receiving a gasket therein, said gasket formed with a base and a side wall to define said recess of said nozzle cover, wherein said pressure maintaining means is a capillary tubing, said tubing having a first end communicating with the nozzle chamber and a second end opening into the air whereby said at least one nozzle is surrounded by ink solvent vapor.

* * * * *